(No Model.)

G. KINNIER, Jr.

CONTROLLING STRAP FOR HARNESS.

No. 284,563. Patented Sept. 4, 1883.

Witnesses:
A. E. Eader
John E. Morris.

Inventor:
George Kinnier Jr.
By Chas B. Mann
Attorney.

UNITED STATES PATENT OFFICE.

GEORGE KINNIER, JR., OF BALTIMORE, MARYLAND, ASSIGNOR TO ADELIA KINNIER, OF SAME PLACE.

CONTROLLING-STRAP FOR HARNESS.

SPECIFICATION forming part of Letters Patent No. 284,563, dated September 4, 1883.

Application filed June 18, 1883. (No model.)

*To all whom it may concern:*

Be it known that I, GEORGE KINNIER, Jr., a citizen of the United States, residing at Baltimore and State of Maryland, have invented certain new and useful Improvements in Controlling-Straps for Harness, of which the following is a specification, reference being had therein to the accompanying drawings.

My invention relates to an improvement in bridle-bit attachments for harness, which I call a "controlling-strap."

Figure 1:
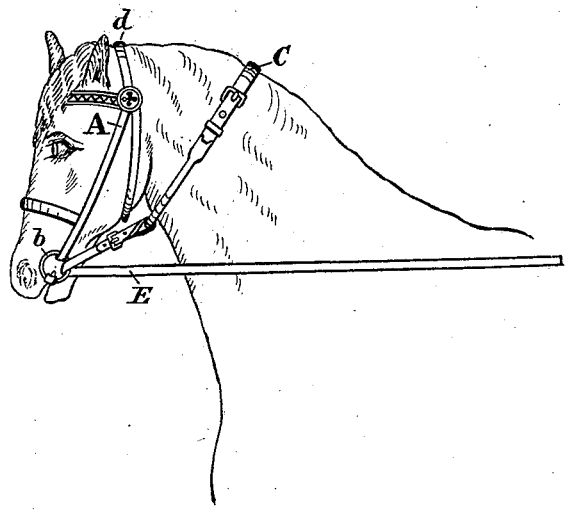
Figure 2:
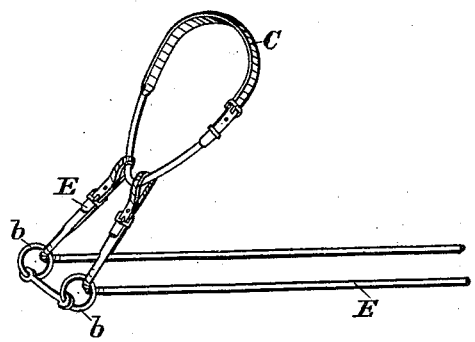

In the drawings hereto annexed, Figure 1 represents a horse's head with the strap, and shows the manner of attaching the driving-lines to the bit. Fig. 2 is a view of the bit separate from the rest of the bridle, the controlling-strap, and the driving-lines.

The letter A designates the bridle, of usual construction; b, the ring of the bridle-bit, to which, commonly, the driving-lines are buckled.

My improvement embraces the strap C, which is loosely placed about the neck of the animal, preferably six or eight inches back from the head-stall d of the bridle. The ends of this strap are buckled or otherwise fastened together, whereby it encircles the neck like a collar. The driving-lines E are passed loosely through the bit-ring b, and the end of each line is separately buckled to the controlling-strap C under the neck, as shown.

It is obvious that, instead of a strap, the part C may be a rope, a chain, or a braid of any suitable material. I do not therefore limit my invention to a strap, but claim any equivalent material or device which may be substituted. By this arrangement of the driving-lines the pull is on the controlling-strap, and a hard-mouthed horse may be restrained with ease. The pull on the bit is in an up and back direction, which I find in practice to be exactly right, as it tends to prevent the animal from gripping the bit with its teeth. The pull on the bit is not severe on the animal's mouth, and the strap C has no disadvantages or objectionable effect. The animal has, ordinarily, free use of its head, but if it attempts to run away it may be controlled by the device most effectively.

I am aware that it has been proposed to employ as a "safety-rein" a single continuous rein having the central portion resting upon the neck of the animal and each of the two end portions which constitute the reins passed through one of the bit-rings, and thence carried back to the hands of the driver; but the objection to such an arrangement is that the single continuous rein can be used only as a means of holding or restraining a fractious animal, and that a separate pair of guiding-lines buckled directly to the bit-ring in the ordinary way are also necessary. By my construction the end of each guiding-line is attached to the strap which encircles the neck. Thereby a single pair of lines serve the double purpose of a "safety" and "guide" rein, besides doing away with the inconvenience of the driver handling two pairs of lines.

Having described my invention, I claim and desire to secure by Letters Patent of the United States—

The combination, with the bit-rings b, of the controlling-strap C, to encircle the neck like a collar, and the driving-lines E, passed loosely through the bit-rings and the end of each line attached to the controlling-strap, as set forth.

In testimony whereof I affix my signature in presence of two witnesses.

GEORGE KINNIER, JR.

Witnesses:
JOHN E. MORRIS,
CHAS. B. MANN.